United States Patent
Tamasas Elrais et al.

(10) Patent No.: US 11,682,983 B2
(45) Date of Patent: Jun. 20, 2023

(54) GAN-BASED MULTIPORT MULTILEVEL CONVERTER/INVERTER

(71) Applicant: University of Central Florida Research Foundation, Inc., Orlando, FL (US)

(72) Inventors: Mohamed Tamasas Elrais, Orlando, FL (US); Issa Batarseh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/575,201

(22) Filed: Jan. 13, 2022

(65) Prior Publication Data

US 2022/0224244 A1 Jul. 14, 2022

Related U.S. Application Data (60) Provisional application No. 63/136,686, filed on Jan. 13, 2021.

(51) Int. Cl.
  *H02J 4/00* (2006.01)
  *H02M 7/483* (2007.01)
  *H02M 3/335* (2006.01)

(52) U.S. Cl.
  CPC ....... *H02M 7/483* (2013.01); *H02M 3/33569* (2013.01)

(58) Field of Classification Search
  CPC .................... H02M 7/483; H02M 3/33569
  See application file for complete search history.

(56) References Cited

U.S. PATENT DOCUMENTS

| 9,318,974 B2 | 4/2016 | Yoscovich et al. |
| 2013/0147272 A1* | 6/2013 | Johnson .................. H02J 3/381 307/29 |

(Continued)

OTHER PUBLICATIONS

T. A. Meynard and H. Foch, "Multi-level conversion: high voltage choppers and voltage-source inverters," PESC '92 Rec. 23rd Annu. IEEE Power Electron. Spec. Conf., 1992, pp. 397-403 vol. 1. 1992.

(Continued)

*Primary Examiner* — Jared Fureman
*Assistant Examiner* — Esayas G Yeshaw
(74) *Attorney, Agent, or Firm* — Fleit Intellectual Property Law; Jeffrey N. Giunta (57) ABSTRACT

A multiport multilevel converter/inverter includes a connection point with a two-line connection. The multiport multilevel converter/inverter also includes a capacitor electrically coupled across the two-line connection of the connection point. The multiport multilevel converter/inverter also has a first flying capacitor multilevel path with a first external two connection port configured to connect outside of the multiport multilevel converter/inverter, and a first interface conveying DC power and that is electrically coupled to the connection point. The multiport multilevel converter/inverter also includes a second flying capacitor multilevel path with a second external two connection port configured to connect outside of the multiport multilevel converter/inverter, and a second interface conveying DC power and that is electrically coupled to the connection point.

11 Claims, 6 Drawing Sheets

(56) References Cited

U.S. PATENT DOCUMENTS

| | | | |
|---|---|---|---|
| 2016/0043659 A1* | 2/2016 | Xu | H02M 1/088 363/131 |
| 2020/0280187 A1* | 9/2020 | Wolter | H02J 3/381 |
| 2022/0200314 A1* | 6/2022 | Zhou | H02J 7/0013 |

OTHER PUBLICATIONS

Y. Lei et al., "A 2-kW Single-Phase Seven-Level Flying Capacitor Multilevel Inverter With an Active Energy Buffer," in IEEE Trans. Power Electron., vol. 32, No. 11, pp. 8570-8581, Nov. 2017.

N. Vukadinovic, A. Prodic, B. A. Miwa, C. B. Arnold, and M. W. Baker, "Ripple minimizing digital controller for flying capacitor DC-DC converters based on dynamic mode levels switching," Proc. IEEE Appl. Power Electron. Conf. Expo (APEC), pp. 1090-1096. Mar. 2017.

C. B. Barth et al., "Design and Control of a GaN-Based, 13-Level, Flying Capacitor Multilevel Inverter," in IEEE J. Emerg. Sel. Top. Power Electron., vol. 8, No. 3, pp. 2179-2191, Sep. 2020.

S. Qin, Y. Lei, Z. Ye, D. Chou and R. C. N. Pilawa-Podgurski, "A High-Power-Density Power Factor Correction Front End Based on Seven-Level Flying Capacitor Multilevel Converter," in IEEE J. Emerg. Sel. Top. Power Electron., vol. 7, No. 3, pp. 1883-1898, 2019.

E. Candan, A. Stillwell, N. C. Brooks, R. A. Abramson, J. Strydom and R. C. N. Pilawa-Podgurski, "A 6-level Flying Capacitor Multilevel Converter for Single Phase Buck-type Power Factor Correction," 2019 IEEE Appl. Power Electron. Conf. Expo. (APEC), pp. 1180 1187. 2019.

Z. Liao, N. C. Brooks, Z. Ye and R. C. N. Pilawa-Podgurski, "A High Power Density Power Factor Correction Converter with a Multilevel Boost Front-End and a Series-Stacked Energy Decoupling Buffer," 2018 IEEE Energy Convers. Congr. Expo. (ECCE), pp. 7229-7235. 2018.

T. Modeer, C. B. Barth, N. Pallo, W. H. Chung, T. Foulkes and R. C. N. Pilawa-Podgurski, "Design of a GaN-based, 9-level flying capacitor multilevel inverter with low inductance layout," 2017 IEEE Appl. Power Electron. Conf. Expo. (APEC), pp. 2582-2589 2017.

N. Pallo, T. Foulkes, T. Modeer, S. Coday and R. Pilawa-Podgurski, "Power-dense multilevel inverter module using interleaved GaN-based phases for electric aircraft propulsion," 2018 IEEE Appl. Power Electron. Conf. Expo. (APEC), pp. 1656-1661. 2018.

D. Chou, K. Fernandez and R. C. N. Pilawa-Podgurski, "An Interleaved 6-Level GaN Bidirectional Converter for Level II Electric Vehicle Charging," 2019 IEEE Appl. Power Electron. Conf. Expo. (APEC), pp. 594-600. 2019.

Z. Ye, Y. Lei, Z. Liao and R. C. N. Pilawa-Podgurski, "Investigation of capacitor voltage balancing in practical implementations of flying capacitor multilevel converters," 2017 IEEE 18th Work. Control Model. Power Electron. (COMPEL), pp. 1-7 2017.

Z. Liao, Y. Lei and R. C. N. Pilawa-Podgurski, "A GaN-based flying-capacitor multilevel boost converter for high step-up conversion," 2016 IEEE Energy Conversion Congress and Exposition (ECCE), pp. 1-7, doi: 10.1109/ECCE.2016.7854684. 2016.

D. Chou, Y. Lei and R. C. N. Pilawa-Podgurski, "A Zero-Voltage-Switching, Physically Flexible Multilevel GaN DC-DC Converter," in IEEE Transactions on Power Electronics, vol. 35, No. 1, pp. 1064-1073, Jan. 2020, doi: 10.1109/TPEL.2019.2914213. 2019.

I. Moon et al., "Design and implementation of a 1.3 kW, 7-level flying capacitor multilevel AC-DC converter with power factor correction," 2017 IEEE Applied Power Electronics Conference and Exposition (APEC), pp. 67-73, doi: 10.1109/APEC.2017.7930674 2017.

D. Chou, K. Fernandez and R. C. N. Pilawa-Podgurski, "An Interleaved 6-Level GaN Bidirectional Converter for Level II Electric Vehicle Charging," 2019 IEEE Applied Power Electronics Conference and Exposition (APEC), pp. 594-600, doi: 10.1109/APEC.2019.8721971. 2019.

M. T. Elrais and I. Batarseh, "Design and Experimental Study of a GaN-based Three-Port Multilevel Inverter," IECON 2021—47th Annual Conference of the IEEE Industrial Electronics Society, 2021, pp. 1-6, doi: 10.1109/IECON48115.2021.9589232. Nov. 13, 2021.

M. T. Elrais and I. Batarseh, "A GaN Based Four-Port Flying Capacitor Multilevel Converter," 2021 IEEE Energy Conversion Congress and Exposition (ECCE), 2021, pp. 2480-2486, doi: 10.1109/ECCE47101.2021.9595748 Nov. 16, 2021.

Yutian Lei, Shibin Qin, Wen-Chuen Liu, Andrew Stillwell, Thomas Foulkes, Zitao Liao Departement of Electrical Engineering and Computer Sciences, University of California, Berkeley CA 94729, "A 2-kW Single-Phase Seven-Level Flying Capacitor Multilevel Inverter With an Active Energy Buffer", IEEE Transactions on Power Electronics, Nov. 2017, pp. 8570-8581, vol. 32, No. 11, IEEE Xplore, pp. 594-600.

Derek Chou, Kelly Fernandez, Robert C.N. Pilawa-Podgurski, An Interleaved 6-Level GaN Bidirectional Converter for Level II Electric Vehicle Charging.

Christopher B. Barth, Pourya Assem, Thomas Foulkes, Won Ho Chung, Tomas Modeer, Yutian Lei, Robert C.N. Pilawa-Podgurski, "Design and Control of a GaN-Based, 13-Level, Flying Capacitor Multilevel Inverter", IEE Journal of Emerging and Selected Topics in Power Electronics, vol. 8, No. 3., Sep. 2020, pp. 2179-2191.

Cong Li, Da Jiao, Mark J. Scott, Chengcheng Yao, Lixing Fu, Xintong Lu, Titus Chen, Jinzhu Li, and Jin Wang, Electrical and Computer Engineering Department, The Ohio State University, Columbus, OH 43210, A 2 k W Gallium Nitride Based Switched Capacitor Three-Port Inverter, pp. 119-124.

Thomas Modeer, Christopher V. Barth, Nathan Pallom Won Ho Chung, Thomas Foulkes, Robert C.M. Pilawa-Podgurski, University of Illinois at Urbana-Champaign, "Design of a GaN-based, 9-level Flying Capacitor Multilevel Inverter with Low Inductance Layout", UTC from IEEE Xplore, pp. 2582-2589.

\* cited by examiner

GAN-BASED MULTIPORT MULTILEVEL CONVERTER/INVERTER

This invention was made with government support under NSF-ECCS-1810733 awarded by the National Science Foundation. The government has certain rights in the invention.

BACKGROUND

Field of the Invention

This invention relates generally to electrical power supplies, and more specifically to Gallium Nitride (GaN) transistor based electrical power converters and inverters.

Related Art

Wide-bandgap power devices such silicon carbide (SiC) and gallium-nitride (GaN), devices have significantly impacted the re-design of power-electronic converters to achieve higher efficiency, higher power density with higher operating temperature and speed. Coupled with the attractive features of multilevel topologies of handling higher power with significant weight and size reduction and improved Total Harmonic Distortion (THD), new applications are available where multifunctionalities and integration opportunities can be developed. The Flying Capacitor Multiple Level (FCML) voltage converter design is gaining increased attention where only a fraction of the voltage is applied across each switching device and the circuit generates output with highly compact power stages. The FCML converter topology has several attractive features including the capability to naturally balance its capacitors voltages to the desired values using Phase shifted Pulse Width Modulation (Phase Shifted PWM)/(PSPWM) modulation, and the power switches need only to block a fraction of the input voltage which enables the use of lower voltage rated switches in high voltage applications. In addition, FCML processes power with high quality output voltage and current. The desire to realize converters with lower weight and smaller size and keeping high efficiency is on the rise, especially in transportation and photovoltaic (PV) power harvesting applications. FCML based converters/inverters address challenges of conventional converters associated with their need for large inductors and capacitor filters. FCML based converters/inverters advantageously allow size reductions due to the inherent frequency multiplication effect seen by the inductor and the charging and discharging of the capacitors at the switching frequency which reduce the energy storage requirement of the capacitors. The flexibility of FCML converter/inverter designs allow circuits to be configured to operate as DC-to-AC inverters, as AC-to-DC converters, as AC-to-AC converters, as interleaved bi-directional AC-to-DC inverters, and as DC-to-DC converters.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The below described systems provide multiport multilevel power converters/inverters with multiple bi-directional power ports that support efficient power conversion between one type of voltage or current to another (e.g., DC-to AC or AC-to-DC) or one level of voltage or current within the same type to another level, or both. In an example, one such converter/inverter has a DC input port, a bidirectional DC port and an AC output port that each operate as an external power connection port for the converter/inverter. In further examples, converter/inverters are able to be configured with any number of ports that each can be individually configured to convey AC power or DC power, or that are switchable between conveying either AC or DC power. These multiport multilevel converters/inverters have a number of paths that use Flying Capacitor Multilevel (FCML) designs based on Gallium Nitride (GaN) switches for the bidirectional power flow. FCML topology has a superior ability for power conversion with high power density, improved Total Harmonic Distortion (THD), and efficiency. These multiple port power converters/inverters are able to be used in a variety of applications including battery and photovoltaic (PV) integration to the electrical AC-grid and providing power to a standalone AC load.

These converters were experimentally verified by building a prototype using GaN switches that includes three ports electrically connected through two 4-level FCML converter paths (one DC-to-AC path and one DC-to-DC path) that each has two interfaces where one interface for each of those two paths share one filtering capacitor. The DC-to-AC path in this prototype is capable of processing power to produce a 1000 W output and incorporates an unfolder for the DC-to-AC conversion. The DC-to-AC path has achieved an efficiency of 98.2% with Total Harmonic Distortion of the AC voltage and current of 1.26% and 1.23% respectively. The DC-to-DC path is capable of processing power in either direction to produce a 2000 W output and has achieved a peak efficiency of 99.43%. Therefore, this prototype can process a power of 3000 W.

The below discussion includes a description based on an example of a three-port converter/inverter with a DC input/output port suitable to attach a battery storage device, a DC input port suitable for providing DC input power, such as could be obtained from a Photovoltaic source, to be delivered to other ports, and an AC port. The AC port is suitable for providing AC output power or receiving input AC power. This example three port converter/inverter is constructed of a bidirectional DC-to-DC path and a DC-to-AC path that includes an unfolding or full-bridge circuit technique. By sharing the same filtering capacitor to provide filtering and to link together both paths, an improved three port multilevel converter/inverter is created. In the present discussion, the terms converter, inverter, and converter/inverter are to be understood to refer to similar circuit topologies and are able to be used interchangeably for the understanding of the main features of the circuits described herein. As discussed below, alterations to the example converter/inverter are able to be made to create multiport multilevel converters/inverters with any suitable number of ports, any suitable number of levels in any suitable combination of input and output ports.

Figure 1A:
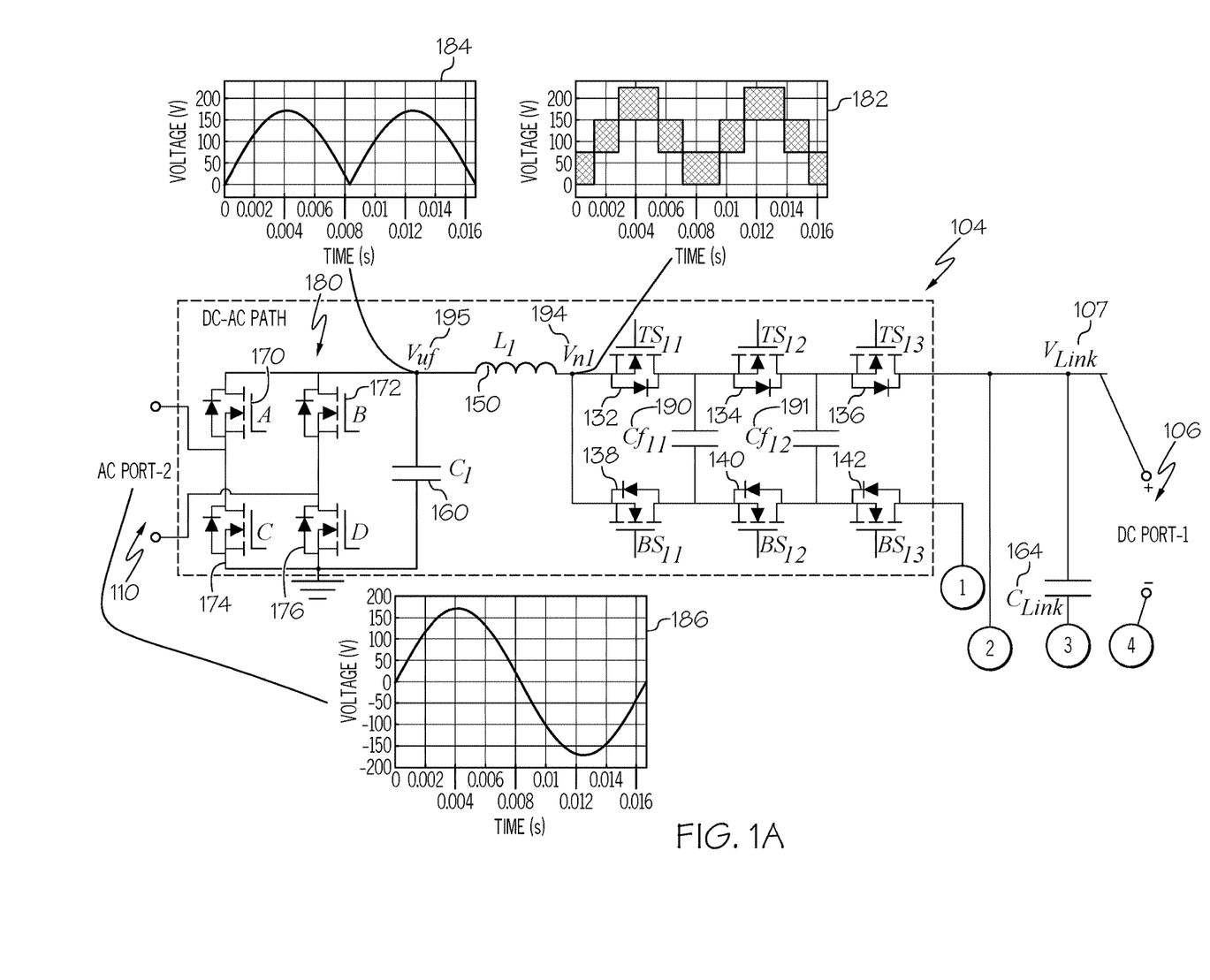
FIGS. 1A and 1B show an example three-port multilevel power converter/inverter, according to an example.
Figure 1B:
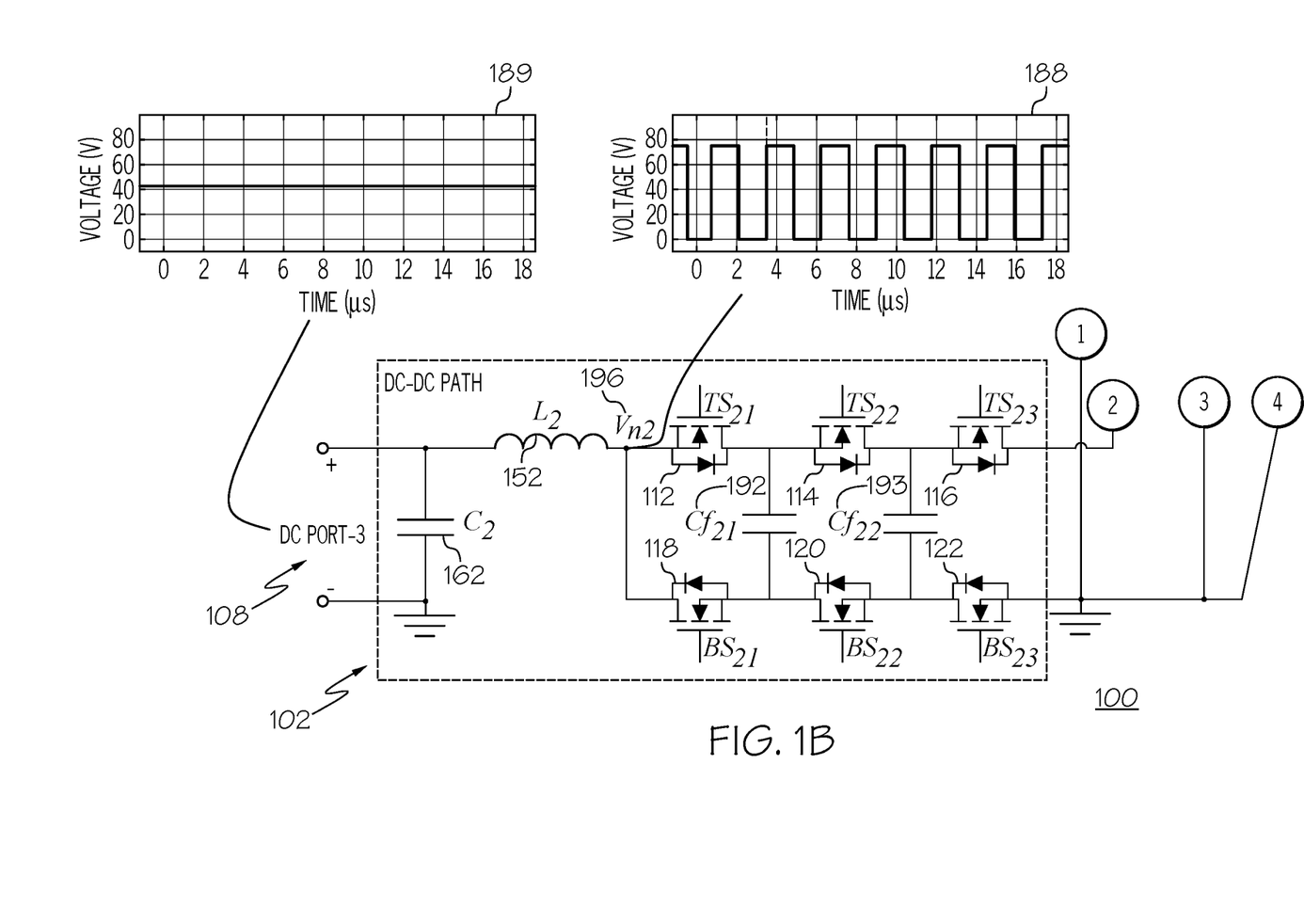

FIGS. 1A and 1B show an example three-port multilevel electrical power converter/inverter 100, according to an example. The three-port multilevel electrical power converter/inverter 100 consists of two paths, a DC-to-AC path 104 and a DC-to-DC path 102 that each include FCML converter/inverter topologies. The DC-to-AC path 104 includes an unfolder 180 to convey a bi-polar AC waveform through its AC port-2 110 that has voltages that extend both positively and negatively from the ground voltage level of the DC ports, e.g., DC port 1 106 and DC port 3 108. The DC-to-AC path 104 and the DC-to-DC path 102 each has two interfaces, with one interface on each end of the path. One interface of each of these paths and the DC port-1 106 are connected to the two-line connections of a connection point, which are shown as the ground and voltage connection $V_{Link}$ 107 on either terminal of the linking capacitor $C_{link}$ 164. The other interface of each of these paths is connected to a respective external two connection port, such as the AC port-2 110 or the DC port-3 108. In the present discussion each port is referred to as a two connection port because there are two connections that are able to convey the positive and negative polarities of DC power or the two conductors of AC power. In the present discussion, an external port refers to a unidirectional or bidirectional power port that conveys power in either one or both of into or out of the multiport multilevel converter/inverter.

The number of levels of the illustrated FCML paths was selected to be 4 in the described example because of its capacitor voltage balancing characteristics compared to FCML circuits with an odd number of levels. In general, converter/inverters paths using any number of levels, either even or odd, are able to also be used in further examples. For each m-level FCML converter/inverter path, where m is the number of levels, 2(m−1) switches are required. In this example design, m=4 and 6 switches are required for each FCML converter/inverter path. Each switch blocks a fraction of the linking voltage equal to $$\frac{V_{Link}}{m-1}$$

plus the flying capacitor voltage ripple. In an example of a $V_{Link}$=225V and a 4 level FCML converter/inverter path, $$\frac{225}{4-1} = 75V + \Delta V_{fc},$$

where $\Delta V_{fc}$ is the flying capacitor voltage ripple. The number of flying capacitors needed for each FCML converter/inverter path is (m−2)=2 for a 4 level FCML path. The two flying capacitors $Cf_{1n}$ (n=1, 2), which are $Cf_{11}$ 190 and $Cf_{12}$ 191, are charged to $$\frac{nV_{Link}}{m-1}.$$

The two flying capacitors $Cf_{2n}$, (n=1, 2), which are $Cf_{21}$ 192 and $Cf_{22}$ 193, are charged to $$\frac{nV_{Link}}{m-1}.$$

In the 4-levels case with two flying capacitors in each path, $$V_{Cf11} = V_{Cf21} = \frac{1V_{Link}}{m-1} = \frac{225}{3} = 75\,V \text{ and}$$

$$V_{Cf21} = V_{Cf22} = \frac{2V_{Link}}{m-1} = \frac{2 \times 225}{3} = 150\,V.$$

The voltages across the flying capacitors are naturally balanced using PSPWM modulation. In the PSPWM, the PWM signals of the three top switches of the DC-to-AC path 104, i.e., switch $TS_{11}$ 132, $TS_{12}$ 134, and $TS_{13}$ 136, and also the three top switches of the DC-to-DC path 108, i.e., switch $TS_{21}$ 112, $TS_{22}$ 114, and $TS_{23}$ 116, are shifted $$\frac{360°}{m-1} = 120°$$

from each other with duty cycle D. The bottom three switches of each FCML converter/inverter path, i.e., switch $BS_{11}$ 138, $BS_{12}$ 140, and $BS_{13}$ 142 of the DC-to-AC path 104 and also switch $BS_{21}$ 118, $BS_{22}$ 120, and $BS_{23}$ 122 of the DC-to-DC path 102, are switched in a complementary manner with respect to the top switches and thus have a duty cycle of (1−D). An advantageous feature of the FCML converter/inverter path is the frequency multiplication effect of the switching frequency ($f_{sw}$) that is seen by the inductor of each path, such as inductor $L_1$ 150 and inductor $L_2$ 152. For each FCML converter/inverter path, the frequency seen by those inductors is $f_{sw} \times (m-1) = 120$ kHz$\times 3 = 360$ kHz, with $f_{sw}=120$ kHz and 4-levels.

The frequency multiplication by a factor of (m−1) and the peak-to-peak inductor voltage swing of $$\frac{V_{Link}}{m}$$

are two factors that allow the inductance value of the inductor of the FCML path to be $(m-1)^2$ smaller than would be the case for a conventional two level converter. The equations used in designing the values of the linking capacitor $C_{Link}$ 164, output capacitors $C_1$ 160 and $C_2$ 162, and flying capacitors 190, 192 and value of ripple voltages on those capacitors, the value of the inductors and the value of ripple current through those inductors, and also the voltage and current ratings of those components are the equations used in the design of FCML converters as are known to practitioners of ordinary skill in the relevant arts.

A rapidly switched pulsed four level staircase rectified sine waveform 182 is synthesized by the switches $TS_{11}$ 132, $TS_{12}$ 134, $TS_{13}$ 136, $BS_{11}$ 138, $BS_{12}$ 140, and $BS_{13}$ 142 at the node $V_{n1}$ 194 on the right side of inductor $L_1$ 150. Then, the rapidly switched pulsed four levels staircase rectified sine waveform 182 is filtered to get clean rectified sine wave 184 at node $V_{uf}$ 195 on the left side of inductor $L_1$ 150. The unfolder 180 is a full bridge includes unfolder switch A 170, unfolder switch B 172, unfolder switch C 174, and unfolder switch D 176 and is driven by suitable clock waveforms to unfold the rectified sine wave 184 at the node $V_{uf}$ 195 to produce the desired sinusoidal AC voltage 186 at the AC port 2 110.

In a prototype of the above described circuit, examples of the switches, such as switches $TS_{11}$ 132, $TS_{12}$ 134, $TS_{13}$ 136, $TS_{21}$ 112, $TS_{22}$ 114, $TS_{23}$ 116, $BS_{11}$ 138, $BS_{12}$ 140, $BS_{13}$ 142, $BS_{21}$ 118, $BS_{22}$ 120, $BS_{23}$ 122, are EPC2034C GaN switches that were selected for their advanced figure of merits in comparison with the silicon MOSFET devices. GaN switches make it possible to use 120 kHz switching frequency as is used in this prototype. Overlapping losses are reduced by careful printed circuit board layout in addition to using small decoupling capacitors that have low parasitic inductance and that are placed as close as possible to the complementary switches in parallel with the flying capacitors to minimize the commutation loop to decrease the parasitic inductance. Such a design reduces the drain-source voltage ringing and allows for fast transition that minimize the overlapping losses. The use of 120 kHz switching frequency for each switch in an example results in switching frequencies of 360 kHz to be seen by the inductors. The two properties of the frequency multiplication along with the reduced voltage across the inductor in the FCML converter/inverter enable the use of a 33 μH, XAL1510-333MED, Coilcraft inductor in an example. The GaN gate drivers that have been used in an example are LM5114 low-side gate driver. Isolated supplies, ADUM5210 in an example, have been used to supply the required floating source to each gate drivers and SI8423BB-D-IS is used in an example as digital isolators for each switch PWM signal. The switches that have been used in an example for the 180 are MOSFETs, STL57N65M5, because the unfolder is switching at line frequency, 60 Hz in this example, MOSFET offer enough switching speed. The switches of the unfolder in an example are driven by Fairchild FAN73932MX half-bridge gate driver. The unfolder placement on the PCB can be chosen to reduce the use of PCB space. Multilayer ceramic are used for the input, output and the flying capacitors for their high energy density and located on the bottom side of the PCB. The desired values of the capacitors' voltages are naturally balanced using PSPWM modulation. The PWM signals of all switches including the unfolder were generated in an example using TI C2000 Microcontroller, TMS320F28379D LaunchPad.

In an example, a prototype was developed to operate with an input voltage of 225V at the DC port-1 106. The first path 104 is configured to operate where the modulation index for the GaN switches of DC-to-AC path 104 is $m_a$=0.75 and produces an AC output waveform of $120V_{rms}$. The second path 102 is configured to operate with a duty cycle for the switches of the DC-to-DC path 102 of D=0.89 to get 200 $V_{DC}$.

The voltage 182 measured at the right side of the first inductor $L_1$ 150 that is $V_{n1}$ 194 is a rapidly switched pulsed four level staircase rectified waveform that is pulsed at the actual frequency of 360 kHz between two levels of the four level staircase following a rectified sine wave pattern with the duration of each pulse varying with time to achieve a short term average voltage value. In the case of the DC-to-AC path 104, the equal $$\frac{V_{Link}}{m-1}$$

step increments of the staircase voltage waveform 182 indicate well-balanced voltages across the flying capacitors in the DC-to-AC path 104. This rapidly switched pulsed four level staircase rectified sine waveform 182 is filtered by the first inductor $L_1$ 150 and first capacitor $C_1$ 160 to produce a filtered rectified sine wave 184 for processing by the unfolder 180 into a sinusoidal AC voltage 186 at the AC Port-2 110.

The switching node voltage 188 measured at the right side of the second inductor $L_2$ 152 that is $V_{n2}$ 196 is the switching node voltage 188 that is pulsed width modulated waveform switching at the actual frequency of 360 kHz, which is three times the switching frequency $f_{sw}$ of each switch. The switching node voltage 188 pulses are of generally equal heights of $$\frac{V_{Link}}{m-1}$$

due to good capacitor voltage balancing in the DC-to-DC path 102. This switching node voltage 188 is filtered by the second inductor $L_2$ 152 and second capacitor $C_2$ 162 to produce a filtered pure DC voltage 189 at the DC Port-3 108.

The example three-port multilevel power converter/inverter 100 has been demonstrated to operate in a configuration where the DC-to-DC path 102 operates as a 1-to-5 DC-to-DC voltage step up converter that converts 36V at the DC port-3 108 to 180 V at the DC port-1 106, thus illustrating the bidirectional capability of that DC-to-DC path.

The example three-port multilevel power converter/inverter 100 has been demonstrated to operate where all the three ports are working at the same time. In this configuration, the DC port-1 106 is receiving 3000 W at 225 V and the DC-to-DC path 102 is delivering a DC power output of 2000 W to the DC port-3 at 200 V and the DC-to-AC path 104 is delivering AC power of 1000 W to the AC port-2 at 120 V. In another demonstration, the three ports are working at the same time and each path is processing a power of 1000 W simultaneously. In other examples the two paths can work separately where one of them can be active and the other one can be shutdown which increase the reliability of the circuit by providing a partial failure mode.

The example three-port multilevel power converter/inverter 100 has been demonstrated to operate where the DC-to-AC path 104 is shutdown, and the DC-to-DC path 102 is operating; the DC port-3 108 is a power input with a voltage of 50 V, an electrical current of 10 A, and input power of 500 W. The DC Port-1 106 is a power output and has an output voltage of 200 V, an output current of 2.5 A, and output power of 500 W.

Figure 2:
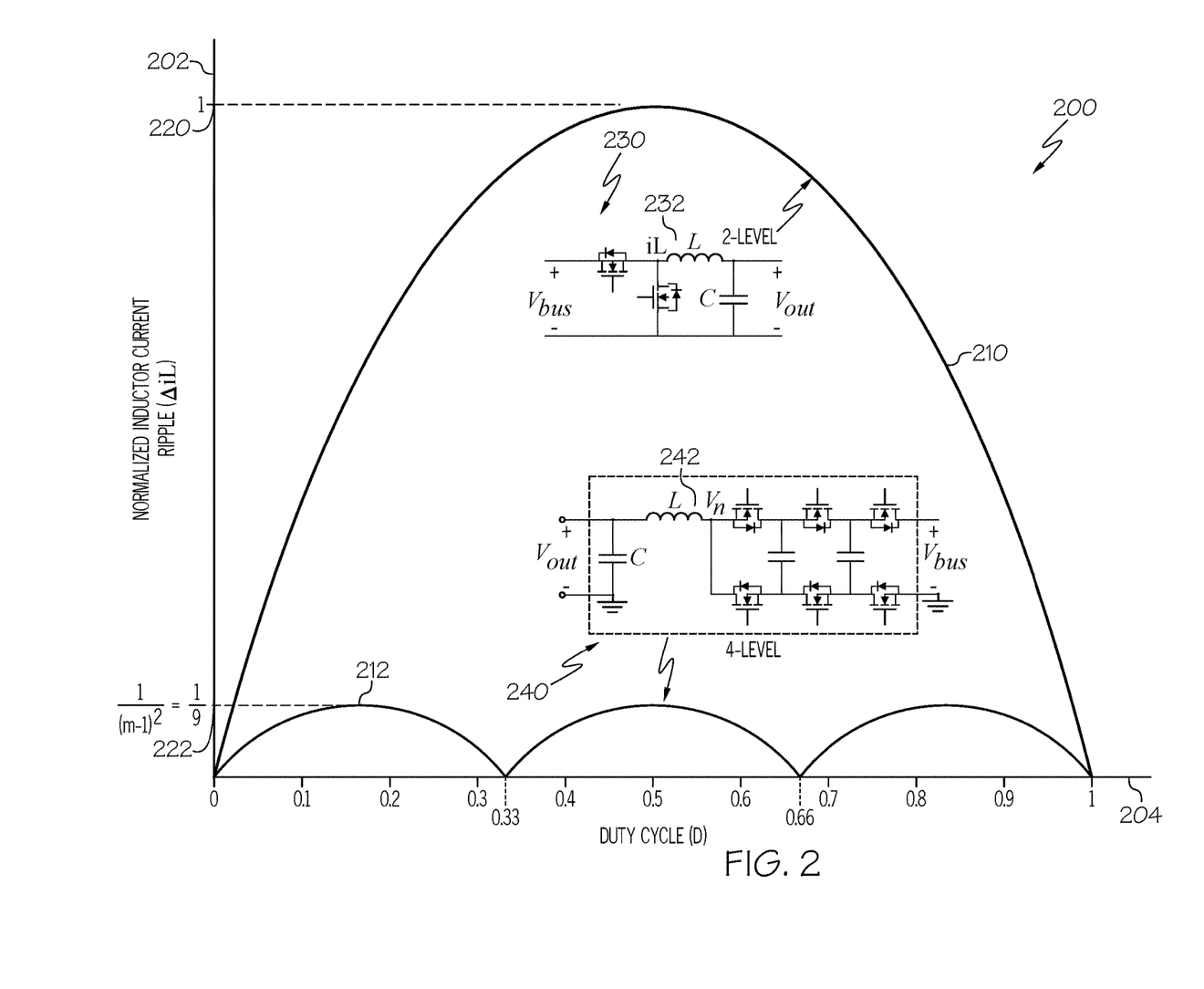
FIG. 2 illustrates normalized inductor current ripple values for two and four level FCML paths as a function of the duty cycle, according to an example.

In another demonstration, the DC-to-AC path 102 is shutdown, and the DC-to-AC path 104 is operating with an input voltage at the DC port-1 106 of 200 V, an input current of 2.5 A that corresponds to an input power of 500 W. The DC-to-AC path 104 then provides AC power at the AC port-2 110 with an RMS output voltage of $120 V_{rms}$, an RMS output electrical current of 4.16 A that corresponds to an output power of 500 W. The Total Harmonic Distortion (THD) of that AC output voltage and current are 1.26% and 1.23%, respectively FIG. 2 illustrates normalized inductor current ripple values for two and four level FCML paths as a function of the duty cycle 200, according to an example. The normalized inductor current ripple values for the two level current ripple curve 210 that indicates current ripple through a first inductor 232 of a two level FCML path 230. The two level FCML path 230 is an example circuit for what is referred to as a "buck converter." The normalized inductor current ripple values for the four level current ripple curve 212 that indicates current ripple through a second inductor 242 of a four level FCML path 240. It should be noted that both the two level curve 210 and the four level curve 212 are normalized to the peak inductor current ripple through the first inductor 232. It is noted that the peak value of the two level current ripple curve 210 is a normalized value of 1 220. The normalized inductor current ripple values for two and four level FCML paths 200 depicts an advantage of the four level current ripple curve 212 over the current ripple of the two level conventional buck curve 210. Due to the above described characteristics of an FCML path with four levels 240, the peak level of the four level current ripple curve 212 is a normalized value of ⅓, which is in general for any m number of levels $$\frac{1}{m-1}$$

smaller than the current ripple of 230.

Figure 3:
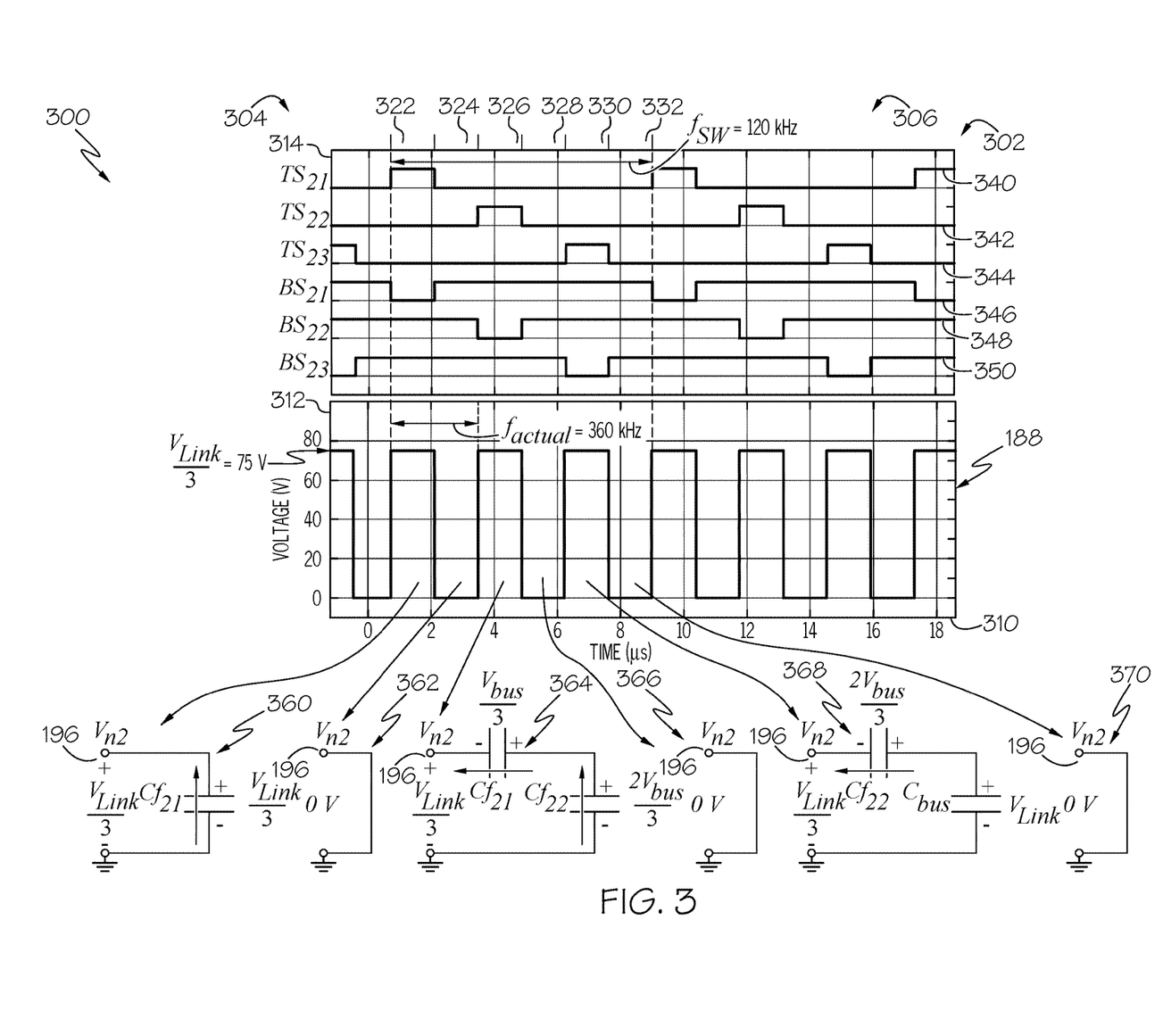
FIG. 3 illustrates the DC-to-DC path gate timing diagram, according to an example.

FIG. 3 illustrates a FCML path gate timing diagram 300, according to an example. The FCML gate timing diagram 300 depicts the sequence of timing signals that are provided to the switches of a four level FCML converter, such as the above described example three-port multilevel electrical power converter/inverter 100. The below description of the FCML gate timing diagram 300 refers to the above described example three-port multilevel electrical power converter/inverter 100 and the components identified therein.

The FCML gate timing diagram 300 includes a switch timing chart 302 that depicts the timing of gate signals applied to the switches of the DC-to-DC path 102 that are used to synthesize the switching node voltage 188 at node $V_{n2}$ 196. The illustrated switching node voltage 188 is time aligned with the switch timing chart 302. Both the switch timing chart 302 and the switching node voltage 188 have the same horizontal time scale 310. The depicted time scale is divided into a first major cycle 304 and a second major cycle 306. The second major cycle 306 is a repetition of the first major cycle 304 and is not described in further detail.

The switch timing chart 302 shows the state of each switch in the DC-to-DC path 102. In the switch timing chart, a "high" level indicates that the switch is on, i.e., conducting, and a "low" level indicates that the switch is off, i.e., not conducting. In general, these indicated "high" or "low" levels do not necessarily indicate gate voltages or other signal levels on the switches and are also able to reflect switches that operate with negative logic where a positive gate voltage turns the switch off and a negative gate voltage turns the gate on.

The switch timing chart 302 indicates a first switch state 340, which is the state of switch $TS_{21}$ 112, a second switch state 342, which is the state of switch $TS_{22}$ 114, a third switch state 344, which is the state of switch $TS_{23}$ 116, a fourth switch state 346, which is the state of switch $BS_{21}$ 118, a fifth switch state 348, which is the state of switch $BS_{22}$ 120, and a sixth switch state 350, which is the state of switch $BS_{23}$ 122.

The first major cycle 304 is divided into a number of phases, a first phase 322, a second phase 324, a third phase 326, a fourth phase 328, a fifth phase 330, and a sixth phase 332. Each of these six phases correspond to a different set of switches in the DC-to-DC path that are activated to create different current paths through the switches and capacitors of that DC-to-DC path.

The FCML gate timing diagram 300 further shows six equivalent circuits, a first equivalent circuit 360, a second equivalent circuit 362, a third equivalent circuit 364, a fourth equivalent circuit 366, a fifth equivalent circuit 368 and a sixth equivalent circuit 370. Each equivalent circuit indicates the equivalent circuit between the node $V_{n2}$ 196 and a ground level.

The first phase 322 begins with a transition of the first switch state 340 from a low state to a high state and a transition of the fourth switch state 346 from the high state to a low state. This results in switch $TS_{21}$ 112, switch $BS_{22}$ 120, and switch $BS_{23}$ 122 being on while the rest of the switches are off. This results in capacitor $Cf_{21}$ 192 being connected across the node $V_{n2}$ 196 and ground as shown in the first equivalent circuit 360. The capacitor $Cf_{21}$ 192 is charged to one third of the voltage on DC port-1 106, i.e., $$\frac{V_{Link}}{3}.$$

This results in the switching node voltage 188 having a voltage level of $$\frac{V_{Link}}{3}$$

during the first phase 322.

The second phase 324 begins with a transition of the first switch state 340 from the high state to the low state and a transition of the fourth switch state 346 from the low state to the high state. This results in switch $BS_{21}$ 118, switch $BS_{22}$ 120, and switch $BS_{23}$ 122 being on while the rest of the switches are off. This results in connecting the node $V_{n2}$ 196 to ground as shown for the second equivalent circuit 362. This results in the switching node voltage 188 having a voltage level of zero during the second phase 324.

The third phase 326 begins with a transition of the second switch state 342 from a low state to a high state and a transition of the fifth switch state 348 from the high state to a low state. This results in switch $TS_{22}$ 114, switch $BS_{21}$ 118, and switch $BS_{23}$ 122 being on while the rest of the switches are off. This results in connecting the capacitors $Cf_{21}$ 192 and $Cf_{22}$ 193 in series across the node $V_{n2}$ 196 and ground as shown in the third equivalent circuit 364. The capacitors $Cf_{21}$ 192 and $Cf_{22}$ 193 are charged to one third and two third of the voltage on DC port-1 106, which are $$\frac{V_{Link}}{3} \text{ and } \frac{2V_{Link}}{3},$$

respectively. This results in the switching node voltage 188 having a voltage level of $$\frac{V_{Link}}{3}$$

during the third phase 326. This switching node voltage 188 value of $$\frac{V_{Link}}{3}$$

resulted from the addition of the voltages across both capacitors taking into account their respective voltage polarities.

The fourth phase 328 includes a transition of the second switch state 342 from the high state to the low state and a transition of the fifth switch state 348 from the low state to the high state. This results in switch $BS_{21}$ 118, switch $BS_{22}$ 120, and switch $BS_{23}$ 22 being on while the rest of the switches are off. This results in connecting the node $V_{n2}$ 196 to ground as is shown for the fourth equivalent circuit 366. This results in the switching node voltage 188 having a voltage level of zero during the fourth phase 328.

The fifth phase 330 begins with a transition of the third switch state 344 from a low state to a high state and a transition of the sixth switch state 350 from the high state to a low state. This results in switch $TS_{23}$ 116, switch $BS_{21}$ 118, and switch $BS_{22}$ 120 being on while the rest of the switches are off. This results in connecting the capacitor $Cf_{22}$ 193 in series with the linking capacitor $C_{link}$ 164 across the node $V_{n2}$ 196 and ground as is shown for the fifth equivalent circuit 368. The capacitor $Cf_{22}$ 193 is charged to two third of the voltage on DC port-1 106, i.e., $$\frac{2V_{Link}}{3}$$

and the linking capacitor $C_{link}$ 164 is charged to the full voltage on DC port-1 106, i.e., $V_{bus}$. This results in the switching node voltage 188 having a voltage level of $$\frac{V_{Link}}{3}$$

during the fifth phase 330. This switching node voltage 188 value of $$\frac{V_{Link}}{3}$$

resulted from the addition of the voltages across both capacitors taking into account their respective voltage polarities.

The sixth phase 332 begins with a transition of the third switch state 344 from the high state to the low state and a transition of the sixth switch state 350 from the low state to the high state. This results in switch $BS_{21}$ 118, switch $BS_{22}$ 120, and switch $BS_{23}$ 122 being on while the rest of the switches are off. This results in connecting node $V_{n2}$ 196 to ground as is shown for the sixth equivalent circuit 370.

Examples of the equations that are able to be used to design each FCML path are as follows.

$$V_o = D \cdot V_{Link}$$

Where $V_o$ is the voltage at the DC port-3 108, D is the duty cycle of the PSPWM signal and $V_{Link}$ is the voltage at DC Port-1 106.

$$\Delta i_L = \frac{(1 - D_{actual})D_{actual} \cdot V_{Link_{actual}}}{L f_{actual}}$$

$$D_{actual} = (m-1)D - \text{Floor}\,[(m-1)D]$$

$$f_{actual} = f_{sw}(m-1)$$

$$V_{Link_{actual}} = \frac{V_{Link}}{(m-1)}$$

Where $f_{sw}$ is the frequency of the PSPWM signals or the switching frequency of each switch.

$$\Delta i_L = \frac{(1 - D_{actual})D_{actual} \cdot V_{Link}}{L f_{sw} \cdot (m-1)^2}$$

$$L = \frac{(1 - D_{actual})D_{actual} \cdot V_{Link}}{\Delta i_L f_{sw} \cdot (m-1)^2}$$

$$V_{C_{fn}} = \frac{n \cdot V_{Link}}{(m-1)}, \text{Where } n \text{ is } (1, 2)$$

$$V_{switch_{nom}} = \frac{V_{Link}}{(m-1)}$$

$$V_{switch} = V_{switch_{nom}} + \Delta V_c$$

Where: $\Delta V_c$ is % of $V_{switch_{nom}}$ $$C_f = \frac{i_{load}}{\Delta V_c \cdot f_{sw} \cdot (m-1)}$$

Figure 4:
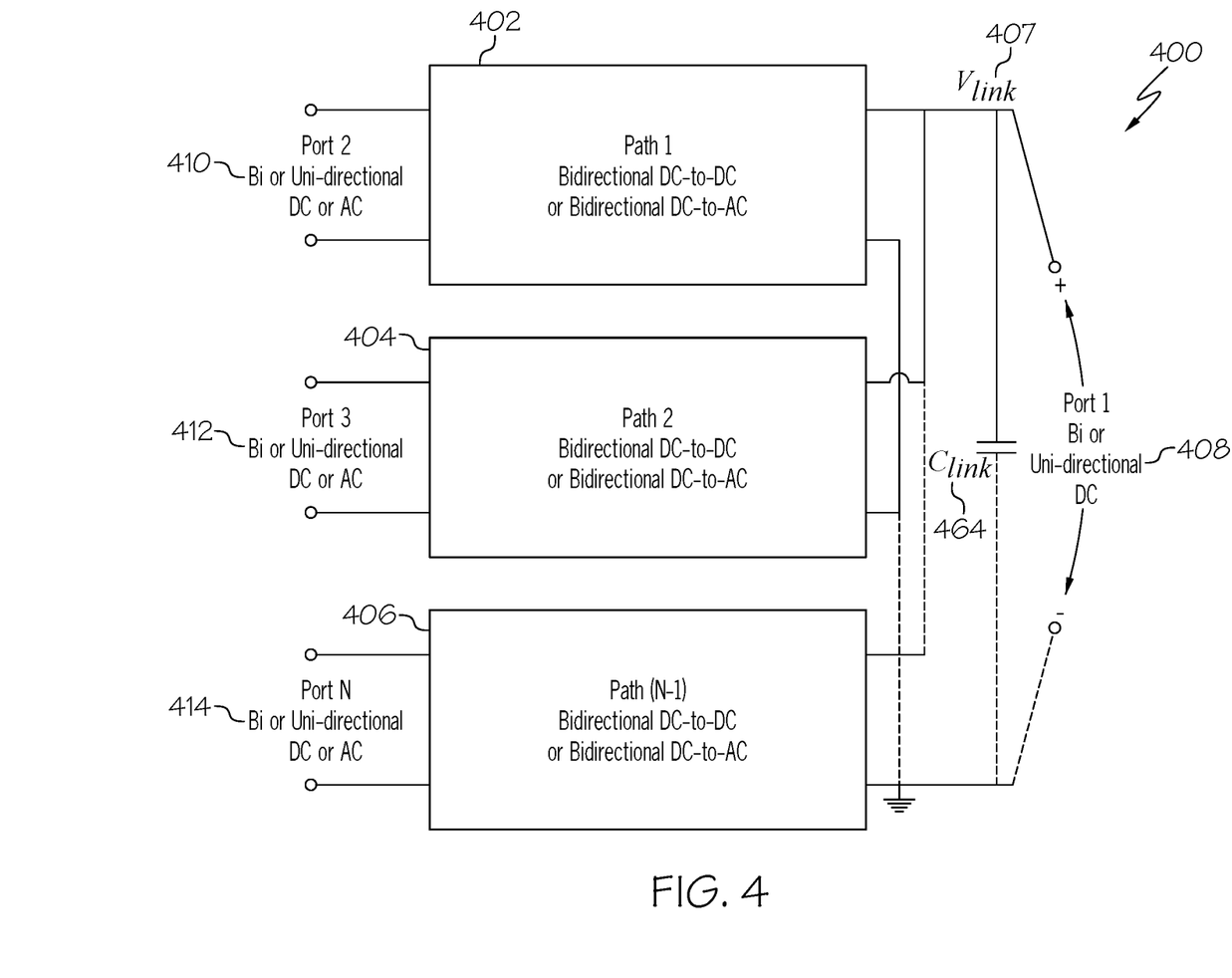
FIG. 4 illustrates a generalized block diagram of the multiport multilevel converter, according to an example.

FIG. 4 illustrates a generalized block diagram of the multiport multilevel converter 400, according to an example. The generalized block diagram of the multiport multilevel converter 400 is depicting an N-port converter/inverter that is able to have any N number of ports resulting in (N=1) number of paths where all of the paths have two interfaces. The illustrated converter 400 shows a path 1 402, a path 2 404, and a path (N=1) 406. One interface of each of these paths and Port 1 408, are connected to the two-line connections of a connection point, which are shown as the ground and voltage connection $V_{Link}$ 407 on either terminal of the linking capacitor $C_{link}$ 464. The other interfaces of each of these paths is connected to a respective two connection port, where each two connection port can be unidirectional or bidirectional and convey AC or DC power such as path 2 410 of path 1 402, port 3 412 of path 2 404, and port N 414 of path (N=1) 406. In this configuration, each path is able to provide DC power to, or take DC power from, the two-line connections of the connection point, which are the terminals of the single capacitor $C_{Link}$ 464 that corresponds to power exchanged through that path's two connection port. The bidirectional various paths, path 1 402, a path 2 404, and a path (N=1) 406, linked through the two-line connections of the connection point make it possible for a N-port multilevel converter/inverter to simultaneously convert/invert any combination of DC to DC, DC to AC, AC to AC and AC to DC electrical power to connect and match different sources and loads through a single integrated unit.

Figure 5:
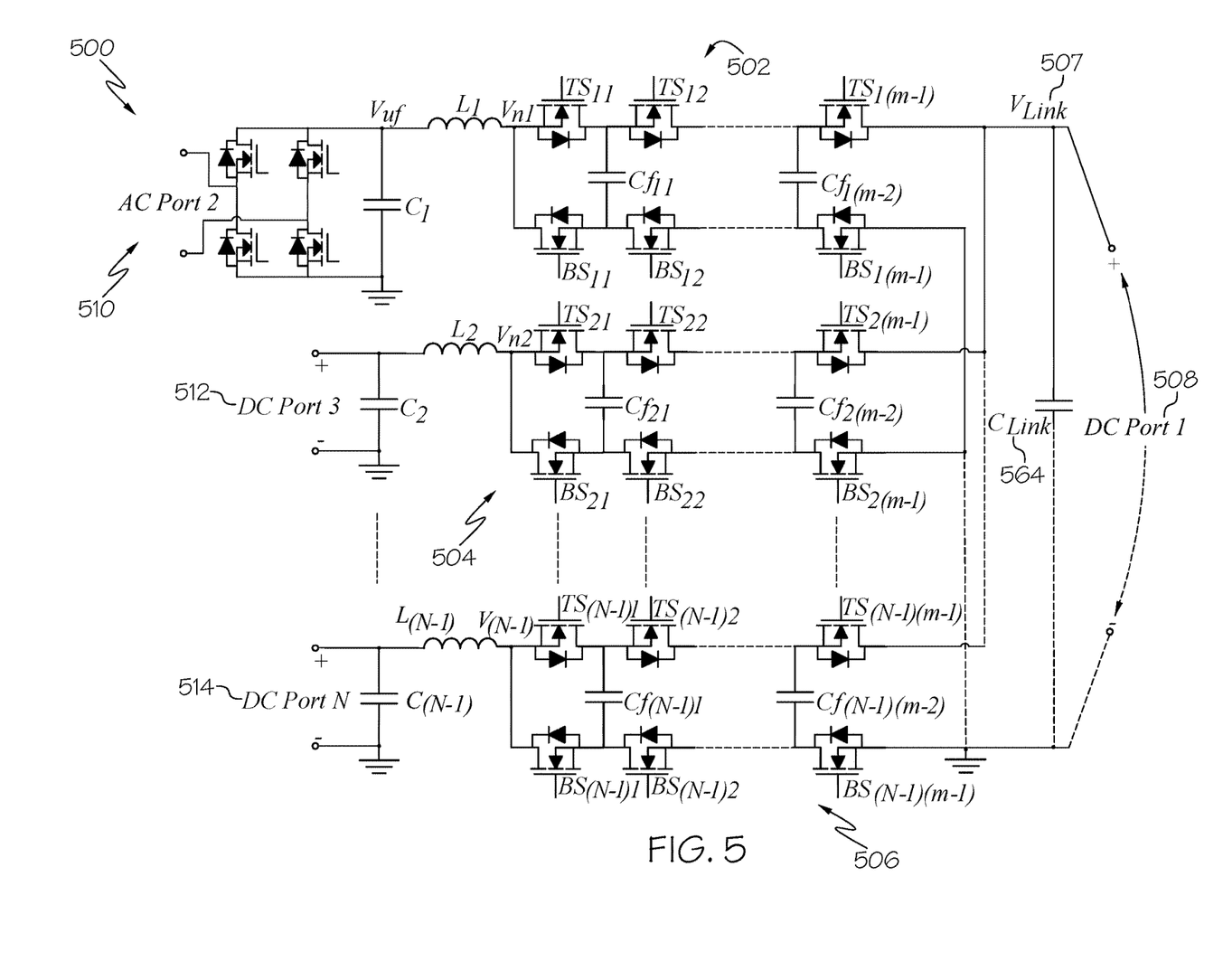
FIG. 5 illustrates a generalized schematic of the multiport multilevel converter, according to an example.

FIG. 5 illustrates a generalized schematic of the multiport multilevel converter 500, according to an example. FIG. 5 illustrates a generalized schematic of the multiport multilevel converter 500 to implement the generalized block diagram of the multiport multilevel converter 400, according to an example. This generalized schematic 500 is depicting an N-port m-level converter/inverter that is able to have any N number of ports with N−1 number of paths, where each path is able to have any m number of levels. The generalized schematic 500 shows a path 1 502, a path 2 504, and a path (N=1) 506. One interface of each of these paths and DC Port 1 508, are connected to the two-line connections of a connection point, which are shown as the ground and voltage connection $V_{Link}$ 507 on either terminal of the linking capacitor $C_{link}$ 564. The other interfaces of each of these paths is connected to a respective two connection port, where each two connection port can be unidirectional or bidirectional such as AC Port 2 510 of path 1 502, DC Port 3 512 of path 2 504, and DC port N 514 of path (N=1) 506. It is noted that path 1 502 has circuitry similar to the DC-to-AC path 104 and both path 2 504 and path (N=1) 506 have circuitry similar to the DC-to-DC path 102 discussed above, however, the paths in the generalized schematic 500 show that they can be constructed of any number of levels m. In various examples, each path is able to be operated independently in either a unidirectional or bidirectional path. In this configuration, each path is able to provide DC power to, or take DC power from, the two-line connections of the connection point which are the terminals of the single capacitor $C_{link}$ 564.

Examples of the above circuits have been developed and have demonstrated the following benefits.

High efficiency, in comparison to the existing Multiport converters (MPC). Two constructed prototypes, Three Port and Four Port multilevel converter/inverter, have achieved 99.43% peak efficiency for the DC-to-DC path and peak efficiency of 98.2% for the DC-to-AC paths, both with hard switching.

High power density, the constructed three port and four port multilevel converter/inverter prototypes have achieved a power density of 15.7 W/cm³ with rated power of 3000 W and 23 W/cm³ with rated power of 5700 W, respectively, excluding the volume of the heatsink and the microcontroller.

The constructed three port and four port multilevel converter/inverter prototypes use Gallium Nitrate (GaN) switches.

The circuit has been demonstrated to be reliable and thermally stable resulting in small heatsink requirement.

The constructed prototypes generate very low harmonic pollution, resulting in very low filter requirements. The three-port prototype has $THD_I$=1.23% and $THD_V$=1.26%. The four-port prototype has $THD_I$=0.71% and $THD_V$=0.78%.

The circuit is transformerless and thus saves the weight and volume of the bulky transformer and also provides a wide voltage conversion ratio.

Generates Lower EMI because of multilevel waveform that has low $$\frac{dv}{dt}$$

stress.

The switches block only a fraction of the input voltage of $$\frac{V_{Link}}{m-1}$$

compared to the entire $V_{bus}$ in the buck converter. The losses are distributed between 2(m−1) switches (compared to two for buck), which give more surface for heat dissipation and easier thermal management.

The circuit has been realized with very low inductor and capacitor values. The operation of the above described circuits increases the frequency seen by the inductor by (m−1) times the switching frequency of each switch. These circuits deploy (m−1)²X smaller magnetic components compared to buck converters. The operation of these circuits reduces the inductor current ripple at least by a factor of (m−1) compared to a conventional 2-level buck converter. The high switching frequency of 120 kHz in an example and the effective frequency seen by the inductor of 360 kHz allows for the use of a very low inductor value. Conventional non-isolated topologies generally operate at 50 kHz and isolated topologies general operate at 100 kHz.

All ports can be operated as bidirectional ports which gives high power flow flexibility among all ports.

The three-port inverter can be used in variety of applications including battery and photovoltaic (PV) grid-integration, standalone AC load, Electric Vehicle Chargers and data center operations.

The above describes illustrative circuits and configurations of the multiport multilevel converter/inverters. It is to be understood that variations of the above are within the scope of this disclosure. For example, any N-port multilevel converter/inverter with any N number of ports, resulting in (N=1) number of paths and the paths are able to deploy FCML with any m number of levels odd or even, and the paths can have the same or different number of levels can be constructed. All the paths have a Unidirectional/bidirectional capabilities where a particular path is able to dispatch power from any two connection port to any two connection port through the connection point. In some examples, the phase shift pulse width modulation clocks driving the switches in each path in a multiport multilevel circuit is able to be independent from all other paths. In some examples, the efficiency of the overall multiport multilevel circuit or any individual path within the circuit is able to be improved by timing their switches to perform soft switching such that the switches open or close with either the current through or voltage across the switch is zero.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims. Unless stated otherwise, terms such as "first" and "second" are used to arbitrarily distinguish between the elements such terms describe.

Thus, these terms are not necessarily intended to indicate temporal or other prioritization of such elements. Note that the term "couple" has been used to denote that one or more additional elements may be interposed between two elements that are coupled such that the one or more additional elements are able to be one of directly coupled without intermediate elements or indirectly coupled in which case intermediate elements are able to be present within the coupling structure.

Although the invention is described herein with reference to specific embodiments, various modifications and changes can be made without departing from the scope of the present invention as set forth in the claims below.

What is claimed is:

1. A multiport multilevel converter/inverter, comprising:
a connection point comprising a two-line connection;

a capacitor electrically coupled across the two-line connection of the connection point, the capacitor comprising a positive terminal and a negative terminal;
a first flying capacitor multilevel path comprising:
   a first external two connection port configured to connect outside of the multiport multilevel converter/inverter;
   a first flying capacitor multilevel converter circuit path comprising a first plurality of capacitors selectively interconnected to one another by a first plurality of GaN transistors to operate as a first multilevel flying capacitor voltage converter; and
   a first interface comprising a first interface transistor and a second interface transistor conveying DC power and that is electrically coupled to the connection point;
a second flying capacitor multilevel path comprising:
   a second external two connection port configured to connect outside of the multiport multilevel converter/inverter;
   a second flying capacitor multilevel converter circuit path comprising a second plurality of capacitors selectively interconnected to one another by a second plurality of GaN transistors to operate as a second multilevel flying capacitor voltage converter; and
   a second interface comprising a third interface transistor and a fourth interface transistor conveying DC power and that is electrically coupled to the connection point,
   a first connection point conductor ohmically connecting, through the connection point, the first interface transistor, the positive terminal of the capacitor, and the third interface transistor; and
   a second connection point conductor ohmically connecting, through the connection point, the second interface transistor, the negative terminal of the capacitor, and the fourth interface transistor.

2. The multiport multilevel converter/inverter of claim 1, further comprising a DC electrical port coupled to the connection point.

3. The multiport multilevel converter/inverter of claim 1, further comprising:
   a third flying capacitor multilevel path comprising:
      a third flying capacitor multilevel converter circuit path comprising a third plurality of capacitors selectively interconnected to one another by a third plurality of GaN transistors to operate as a third multilevel flying capacitor voltage converter; and
      a third external two connection port configured to connect outside of the multiport multilevel converter/inverter; and
      a third interface comprising a fifth interface transistor and a sixth interface transistor conveying DC power and that is electrically coupled to the connection point, wherein
      the first connection point conductor ohmically connects, through the connection point, the first interface transistor, the positive terminal of the capacitor, the third interface transistor, and the fifth interface transistor; and
      the second connection point conductor ohmically connects, through the connection point, the second interface transistor, the negative terminal of the capacitor, the fourth interface transistor, and the sixth interface transistor.

4. The multiport multilevel converter/inverter of claim 1, where the first flying capacitor multilevel path comprises an unfolder to convert the voltage waveform produced within the first flying capacitor multilevel path to an AC power at the first external two connection port.

5. The multiport multilevel converter/inverter of claim 1, where the first flying capacitor multilevel path performs bidirectional DC-to-AC or AC-to-DC power conversion between the first external two connection port and the first interface.

6. The multiport multilevel converter/inverter of claim 1, where the second flying capacitor multilevel path performs bidirectional DC-to-DC power conversion between the second external two connection port and the second interface.

7. The multiport multilevel converter/inverter of claim 1, wherein any of the first external two connection port or the second external two connection port are configurable to convey DC or AC power.

8. The multiport multilevel converter/inverter of claim 1, wherein the first flying capacitor multilevel path and the second flying capacitor multilevel path each comprises a respective four level flying capacitor multilevel voltage converter circuit.

9. The multiport multilevel converter/inverter of claim 1, wherein the first plurality of GaN transistors are controlled by a phase shifted pulse width modulated signals operating to balance voltages across the plurality of flying capacitors.

10. The multiport multilevel converter/inverter of claim 9 wherein the phase shifted pulse width modulated signals operate at a frequency of at least 120 KHz.

11. An N-port multilevel converter/inverter comprising:
   any N number of external two connection ports;
   (N−1) number of paths where the paths are individually able to deploy FCML with any respective m number of levels odd or even,
   where all paths have bidirectional capabilities,
   where each path in the N−1 number of paths is coupled to a connection point comprising a capacitor with a positive terminal and a negative terminal,
   where each path comprises:
      an external two connection port configured to connect outside of the N-port multiport multilevel converter/inverter;
      a flying capacitor multilevel converter circuit path comprising a plurality of capacitors selectively interconnected to one another by a plurality of transistors to operate as a multilevel flying capacitor voltage converter; and
      an interface comprising a respective first interface transistor and a respective second interface transistor conveying DC power and that is electrically coupled to the connection point, and
   where first connection point further comprises:
      a first connection point conductor ohmically connecting the respective first interface transistor of each path to the positive terminal of the capacitor; and
      a second connection point conductor ohmically connecting the respective second interface transistor of each path to the negative terminal of the capacitor, and
   where the N-port multilevel converter/inverter is able to dispatch power from any external two connection port to any other external two connection port through the connection point, so as to perform conversion of any of DC-to-DC, DC-to-AC, AC-to-AC and AC-to-DC.

* * * * *